United States Patent [19]

Aoyagi et al.

[11] Patent Number: 4,751,674
[45] Date of Patent: Jun. 14, 1988

[54] APPARATUS FOR NUMBERING OUTLINE DATA AND FOR SELECTING OUTLINE FORMAT DATA WHICH CORRESPONDS TO THE OUTLINE POSITION OF A CURSOR

[75] Inventors: Kouji Aoyagi; Akihide Demura, both of Kanagawa; Yoshinori Tanba, Tokyo; Tsutomu Amo; Michie Toyoda, both of Kanagawa, all of Japan

[73] Assignee: Sony Corporation, Tokyo, Japan

[21] Appl. No.: 739,883

[22] Filed: May 31, 1985

[30] Foreign Application Priority Data

May 31, 1984 [JP] Japan .................................. 59-11703
Jun. 9, 1984 [JP] Japan .................................. 59-118650

[51] Int. Cl.⁴ ........................ G06F 3/153; G06F 3/12
[52] U.S. Cl. ................................. 364/900; 364/521; 340/735; 400/76; 400/279
[58] Field of Search ... 364/200 MS File, 900 MS File, 364/518, 521; 340/750, 799, 735, 790; 400/63, 76, 279

[56] References Cited

U.S. PATENT DOCUMENTS

| | | | |
|---|---|---|---|
| 4,205,922 | 6/1980 | Pascoe | 364/900 X |
| 4,228,430 | 10/1980 | Iwamura | 340/735 X |
| 4,416,558 | 11/1983 | McInroy et al. | 400/279 |
| 4,454,576 | 6/1984 | McInroy et al. | 364/200 |
| 4,481,603 | 11/1984 | McCaskill et al. | 364/900 |
| 4,625,202 | 11/1986 | Richmond et al. | 340/73 X |
| 4,677,585 | 6/1987 | Ikegami et al. | 364/900 |

OTHER PUBLICATIONS

Information Storage Retrieval, vol. 10, Computerized Text Editing and Processing with Built-In Indexing, pp. 211-228.
IBM Technical Disclosure Bulletin, Collection of Text Elements, S. B. Boothby, H. T. Norton and G. S. Peters, vol. 13, No. 4, Sep. 1970, pp. 982-985.

Primary Examiner—Archie E. Williams, Jr.
Assistant Examiner—Thomas C. Lee
Attorney, Agent, or Firm—Lewis H. Eslinger; Jay H. Maioli

[57] ABSTRACT

An automatic numbering apparatus for use with a text processing system has first storage element for storing a starting position specified on a display screen of a display and the kind or type of a corresponding outline number, an outline number generator for sequentially generating, when the starting position of the specified item is specified on the display screen and a predetermined key is operated, outline numbers corresponding to the starting positions of the specified items, second storage element for storing the outline number generated by the outline number generator, the starting position thereof, and a corresponding page and text inputted by a data input device (keyboard), and an outline searching device for searching for the outline number, the corresponding position and the corresponding page of the stored contents in the second storage means, whereby the text containing the items can be printed out and a table of contents comprising a list of the items and the corresponding pages as searched by the outline searching device can be printed out on paper. Document data formed from character data inputted by the data input device is stored in a text memory and displayed on the display device. When a mode detector detects that a numbering mode has been selected, a data processor searches for previously specified outline numbers and generates a subsequent index number, the index number automatically being set on a document text specified by the text data.

14 Claims, 7 Drawing Sheets

OUTLINE FORMAT MENU

Outline Number
- Level 1 => I = Capital Roman Numerals
- Level 2 => i = Small Roman Numerals
- Level 3 => A = Capital Alphabet
- Level 4 => a = Small Alphabet
- Level 5 => 1 = Arabic Numerals
- Level 6 =>
- Level 7 =>

Outline Pattern
- Level 1 => 1 = [ ]
- Level 2 => 2 = ( )
- Level 3 => 3 =
- Level 4 => 4 =
- Level 5 => 5 = .
- Level 6 => 6 =
- Level 7 =>

Label String
- Level 1 => (Up to 10 characters)
- Level 2 =>
- Level 3 =>
- Level 4 =>
- Level 5 =>
- Level 6 =>
- Level 7 =>

OUTLINE FORMAT MENU

Outline Number

- Level 1 => I
- Level 2 => I
- Level 3 => A
- Level 4 => 1
- Level 5 => a
- Level 6 => 1
- Level 7 => a.i I = Capital Roman Numerals
i = Small Roman Numerals
A = Capital Alphabet
a = Small Alphabet
1 = Arabic Numerals

Outline Pattern

- Level 1 => 6
- Level 2 => 3
- Level 3 => 6
- Level 4 => 6
- Level 5 => 2
- Level 6 => 2
- Level 7 => 2

1 = [
2 = (
3 = )
4 = ]
5 = s.
6 = .

Label String

- Level 1 => Chapter
- Level 2 => ▶
- Level 3 => ▶
- Level 4 => ▶
- Level 5 => ▶
- Level 6 => ▶
- Level 7 => ▶

(Up to 10 characters)

APPARATUS FOR NUMBERING OUTLINE DATA AND FOR SELECTING OUTLINE FORMAT DATA WHICH CORRESPONDS TO THE OUTLINE POSITION OF A CURSOR

BACKGROUND OF THE INVENTION

1. Field of the Invention

This invention relates to display editing apparatus for use in text processing.

2. Description of the Prior Art

Generally, a word or text processor sequentially forms a series of items of text data on the basis of input character data generated by operating keys and the like. When the output text data is printed out, the output text data is processed such that a new page is started at every specified line, page numbers are added to the output text data, and so on.

In various documents such as reports and the like comprising portions of text headed by numbered outlines or outline items, it is often desired to create a so-called table of contents in which an outline number is added to each outline item in accordance with the contents of the document. In previously proposed word processing or text processing apparatus, when making a document with the combination of the table of contents creation and outline creation, the outline number is sequentially inputted thereto by manual operations as one of a series of items of character data. Accordingly, upon creating a document in accordance with the table of contents creation by means of previously proposed text processing apparatus, the numbering operation is very complicated because it involves confirming the number of the preceding item and so on. This prevents previously proposed text processing apparatus from creating such documents efficiently.

SUMMARY OF THE INVENTION

Accordingly, it is an object of this invention to provide a display editing apparatus for use in text processing for automatically numbering and displaying a plurality of items of data and outline position data in which various kinds of items inserted into input text data can be extracted to thereby automatically and easily form a table of contents.

It is another object of the invention to provide a display editing apparatus for use in text processing for automatically numbering and displaying a plurality of items of data and outline position data which can automatically carry out numbering on a document text for efficient text processing.

According to a first aspect of the invention there is provided a display editing apparatus for use in text processing for automatically numbering and displaying a plurality of items of outline data and outline position data, the apparatus comprising:

display means for displaying outline format data of the outline data; storage means for storing the outline format data and the outline position data; and processing means connected to receive a command signal for determining the outline data to be displayed by the display means, the processing means comprising (a) means for generating a positioning signal which indicates a cursor position, (b) means for comparing the positioning signal with the outline position data, (c) means responsive to the comparing means for selecting one of the items of outline format data, and (d) means for supplying the selected outline format data to the display means.

According to a second aspect of the present invention there is provided an automatic numbering apparatus for use with a text processing system, the apparatus having first storage means for storing a starting position specified on a display screen of a display and the kind or type of a corresponding outline number, an outline number generator for sequentially generating, when a starting position of a specified item is specified on the display screen of the display and a predetermined key is operated, outline numbers corresponding to the starting positions of the specified items, second storage means for storing an outline number generated by the outline number generator, the starting position thereof, the corresponding page and text inputted by a data input device, and an outline searching device for searching for the outline number, the corresponding position and the corresponding page of the stored contents in the second storage means, whereby the text containing the items can be printed out and a table of contents having the items and the corresponding pages as searched by the outline searching device can be printed out on paper.

According to a third aspect of the invention there is provided a text processing apparatus in which document data formed from character data inputted by a data input device is stored in a text memory and displayed on a display device, the apparatus including a mode specifying and inputting device for specifying a numbering mode, a mode detector for detecting whether or not the numbering mode is specified, and a data processor for searching for outline numbers already specified on the basis of the detected output from the mode detector and generating a subsequent index number, the index number automatically being set on a document text specified by the text data.

The above, and other objects, features and advantages of this invention will be apparent from the following detailed description of illustrative embodiments which is to be read in connection with the accompanying drawings.

DESCRIPTION OF THE PREFERRED EMBODIMENTS

A display editing apparatus or automatic numbering apparatus embodying the invention for use in a text or word processing system will now be described with reference to the accompanying drawings.

Figure 1:
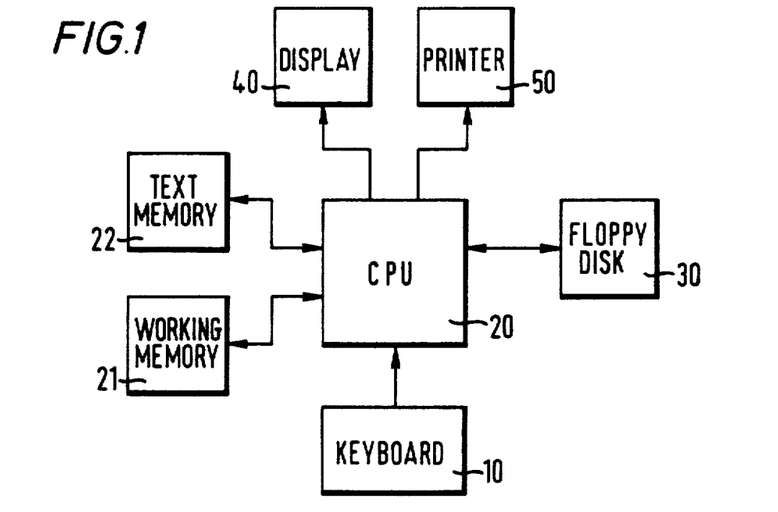
FIG. 1 is a block diagram schematically showing a display editing apparatus embodying this invention for use in text processing for automatically numbering and displaying a plurality of items of outline data and outline position data.

Referring first to FIG. 1, the apparatus comprises a keyboard 10 for setting or inputting various items of character data and control data, a central processing unit (CPU) 20 formed of a microcomputer and operative to process input data provided by operation of the keyboard 10 to create a document, an internal memory such as a working memory 21 used as a buffer memory when various items of data are processed by the CPU 20, a text memory 22 for storing output document data and so on, a floppy disk 30 (accomodated in a floppy disk drive) for externally storing program data for operating the CPU 20 and text data or the like, a display 40 for use in displaying the output data, a printer 50 for use in printing out the data on paper, and so on.

In this embodiment, the keyboard 10 is provided with character keys for setting or inputting alphabetical data and numerical data and control or operation mode specifying keys for setting or inputting control data for controlling the operation of the apparatus. In accordance with the operation of the keys of the keyboard 10, various items of character data and control data can be supplied to the CPU 20.

The CPU 20 processes various items of character data and control data supplied thereto by operation of the keys of the keyboard 10 in accordance with a predetermined program to thereby produce output document data. The output document data is stored in the text memory 22 and displayed on a display screen of the display 40.

While a text forming and processing mode carried out by using the CPU 20 may be in accordance with a normal text forming or processing mode as generally carried out by word processors, this embodiment of the invention enables a numbering mode for outline creation and numbering and table of contents creation to be selected or specified by suitable operation of the keys of the keyboard 10.

Figure 2:
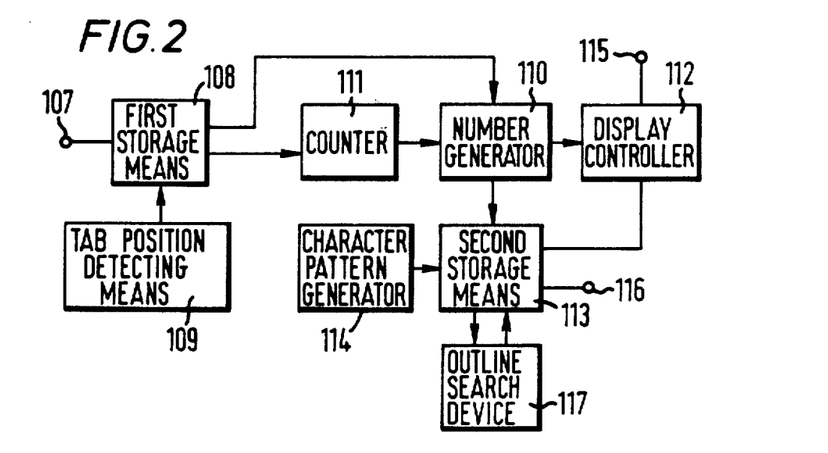
FIG. 2 is a functional block diagram of part of the apparatus of FIG. 1.

FIG. 2 is a block diagram illustrating in more detail the functioning of part of the apparatus illustrated in FIG. 1. As shown in FIG. 2, an input terminal 107 is connected to a first storage means 108. A tab position detecting means 109 is connected to the first storage means 108. The first storage means 108 is connected directly to a number generator 110 and is connected also to a counter 111 which is in turn connected to the number generator 110. The number generator 110 is connected to a display controller 112 which has an output terminal 115 connected to the display 40 via the CPU 20. A second storage means 113 is connected as shown to the number generator 110, the display controller 112, a character pattern generator 114 (connected to the keyboard 10) and an outline search device 117. The second storage means 113 has an output terminal 116 which is connected to the printer 50 via the CPU 20. The functions and interrelationships of the items shown in FIG. 2 are described hereinbelow.

Figure 3:
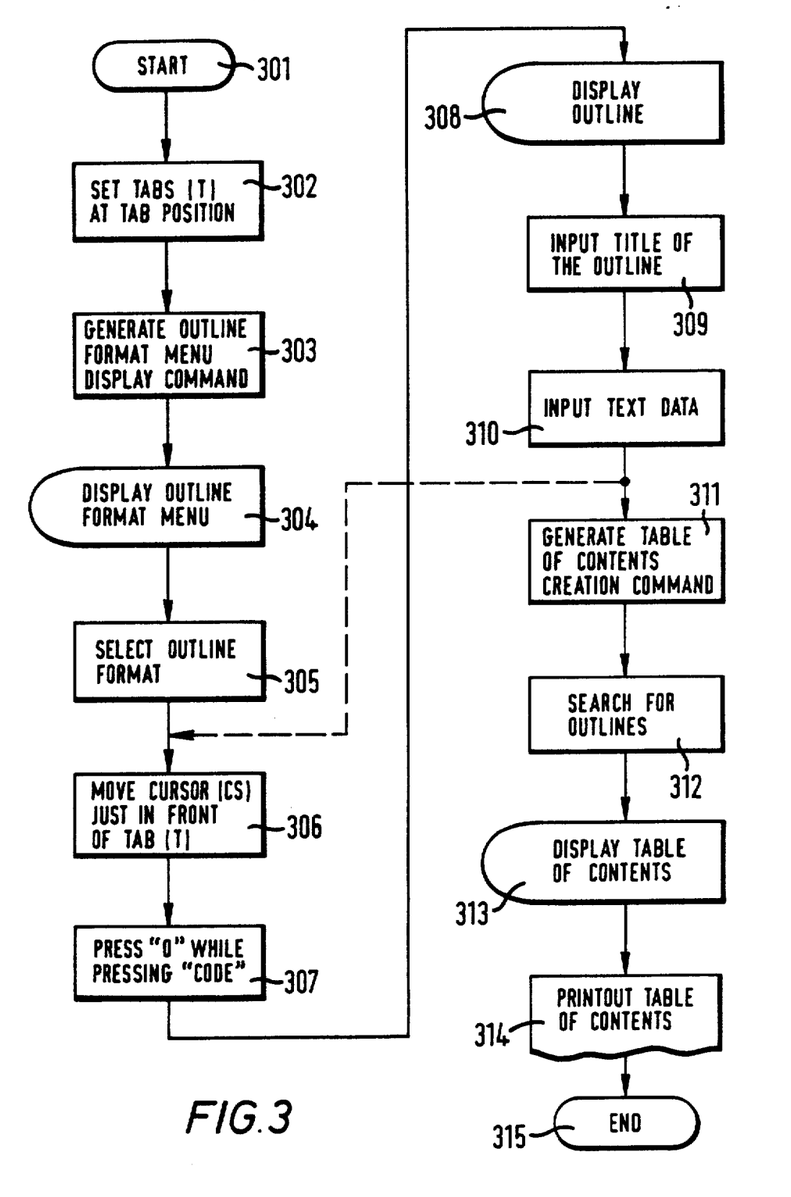
FIG. 3 is a flow chart showing the functioning of the apparatus of FIG. 1.

FIG. 3 is a flow chart illustrating the operation of the apparatus shown in FIGS. 1 and 2 to create (and automatically number) outlines and to create a table of contents. The operation will first be described briefly with reference to FIG. 3 and then described in more detail with reference to FIGS. 4 to 11.

It is assumed that the user of the apparatus wishes to create a document (for example, a report) comprising text which is divided into portions such as chapters and/or sections, each of which is to be headed with an outline or outline item which comprises a number and may be followed by a title or other heading. The apparatus enables the outline to be of predetermined format and to be numbered automatically. Also, after creation of the document, the apparatus enables a table of contents to be compiled by listing the outlines and associated titles.

Referring to FIG. 3, the process of outline creation will be described first. After operation is started (block 301), tabs T are set at tab positions (block 302). This can be accomplished with the apparatus in the normal text forming mode. Next, an outline format display command is generated (block 303). This command may, for example, be generated by operating simultaneously a "CMD" key and the "O" alphabet key of the keyboard 10 and then operating an "EXECUTE" key of the keyboard 10. As a result of this command, an outline format menu is displayed on the display screen of the display 40 (block 304). In accordance with instructions included in the menu, the user can then select a format for the outlines (block 305). This having been done, the user can proceed to create the document.

To create the first outline, the user moves a cursor CS (FIG. 4) on the screen of the display 40 until the cursor is positioned just in front of or in vertical alignment with the tab T corresponding to the desired outline position (block 306). The user then simultaneously presses a "CODE" key and the "O" alphabet key of the keyboard 10 (block 307). This results in the apparatus entering the numbering mode, whereupon an outline is created and displayed automatically (block 308) on the screen of the display 40 at the tab position. The user may then key or type in a title associated with the outline (block 309) and then reverts to the normal text forming mode and proceeds to key or type in (block 310) the text that is to follow the outline. When the next outline is to be created, the user causes the procedure to loop back to the input to the block 306 (numbering mode) as represented by the dotted line in FIG. 3. This procedure is repeated indefinitely, until the document is complete, each outline being automatically numbered and created.

If, when the document has been completed, the user wishes to generate a table of contents, a suitable command is generated (block 311) by operating an appropriate key or keys of the keyboard 10. The apparatus then searches the document for the outlines (block 312) and the corresponding page numbers of the text and assembles them together and displays them on the display screen of the display 40 (block 313) as the table of contents. The table can then be printed out (block 314) by means of the printer 50, whereupon the process can be ended (block 315).

Figure 4:
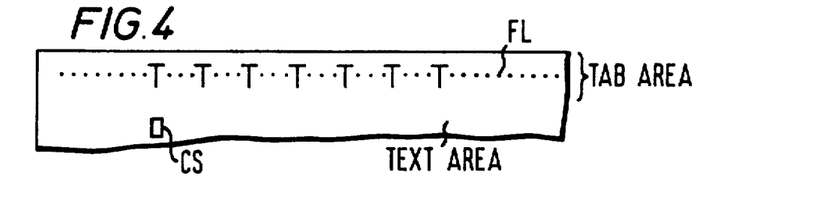
FIG. 4 shows part of a display screen of the apparatus of FIG. 1.

FIG. 4 shows an upper region of the display screen of the display 40. The screen comprises a tab area, which is a marginal strip disposed at the top, and a text area. A format line FL in the form of a broken line is displayed on the upper portion of the display screen of the display 40 in the tab area. To accomplish tab setting operation shown in the block 302 of FIG. 3, a cursor shifting key or keys of the keyboard 10 is operated to shift the cursor CS on the display screen to a desired position in the row (horizontal) direction to specify a starting position of an item, and then, for example, a "TAB" key of the keyboard 10 is pressed, whereupon a tab position mark "T" is displayed on the format line FL at a position corresponding to the position of the cursor CS in the row direction of the display screen. This operation is repeated for plural positions spaced in the row (horizontal) direction, so that starting positions of respective items containing outline numbers classified in accordance with a number of kinds or types of required outline numbers (see below) are specified, and tab positions marks "T" indicative of the starting position of outline formats containing format numbers of, for example, 7 levels or positions are displayed on the format line FL as shown in FIG. 4. As will be described later, the data indicative of the starting positions of the specified items is supplied to the input terminal 107 of FIG. 2 together with other data and then delivered to and stored in the first storage means 108. The first storage means 108 and the second storage means 113, which will be described more fully below, can comprise part of memory areas of the working memory 21, the text memory 22 and the floppy disk 30 shown in FIG. 1.

Figure 5:
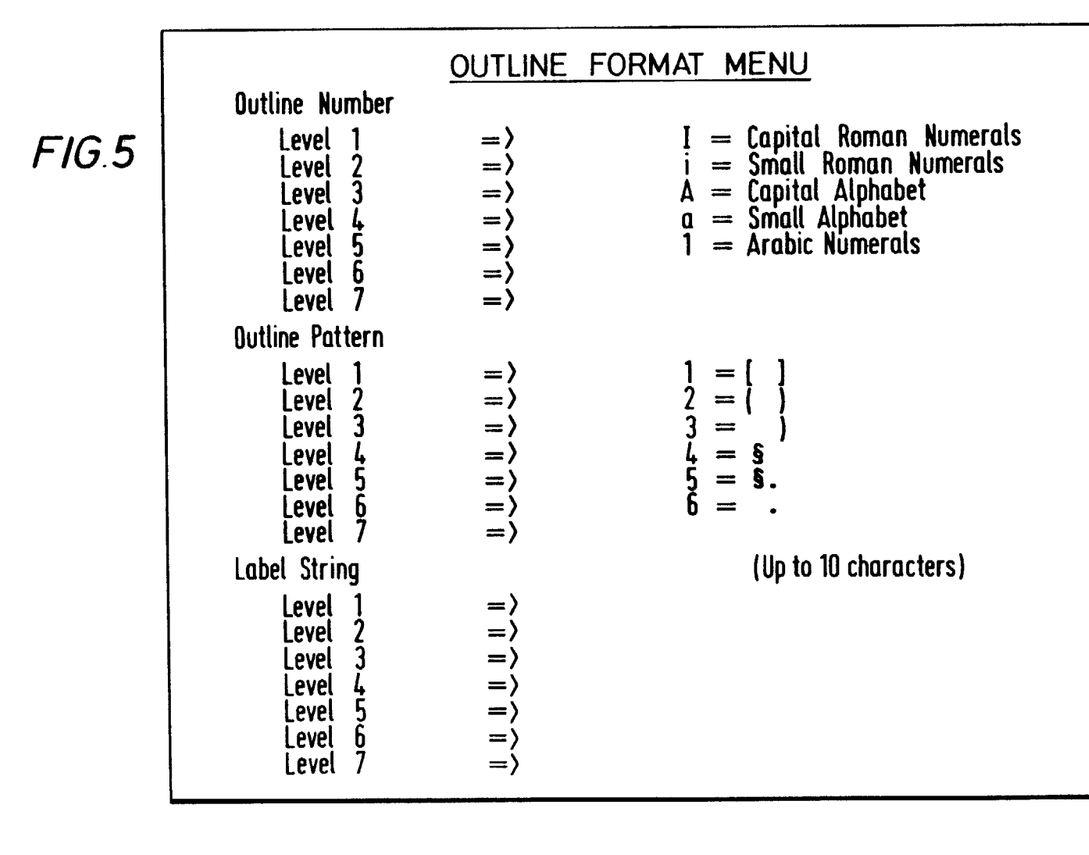
FIG. 5 shows the display screen with an outline format menu displayed thereon, prior to selection from the menu.

Then, by operation of the keyboard 10, the outline format menu command is generated (block 303 of FIG. 3) and an outline format menu comprising various sections is displayed on the display screen of the display 40 (block 304 of FIG. 3) as shown in FIG. 5. As shown in FIG. 5, the outline format menu may be for example include three sections, namely an "outline number" section enabling one of several kinds or types of number to be selected, an "outline pattern" section enabling one of several patterns each comprising one or more symbols to be selected, and a "label string" section enabling the selection of a string of up to ten characters (such as a name) to be selected. In the example illustrated, different outline numbers, formats and label strings can be selected (block 305 of FIG. 3) for each of the 7 available levels.

The "outline number" that can be specified or selected for each of levels 1 to 7 may, for example, be any of five different kinds or types, namely "capital Roman numerals", "small Roman numerals", "capital alphabet" (capital or upper case letters), "small alphabet" (small or lower case letters) and "Arabic numerals". Any of these five different kinds or varieties of numbering system can be specified for each level by selecting 1, i, A, a or 1, respectively, as indicated in FIG. 5, and it is to be understood that the expression "numbering" as used herein encompasses identification by means of the allocation of letter sequences as well as number sequences (Roman or Arabic).

The "outline pattern", which is attached to (generally following) the "outline number" when an outline is created (see below), can be any one of the six symbols or symbol groups "[ ]", "( )", ")", "§", "§." and " ." and is selected for each level by specifying any one of the numbers 1 to 6 as shown in FIG. 5.

The "label string" selected for each level, which is allocated to (generally preceding) the associated outline number when an outline is created (see below), may be any desired character string (such as "Chapter" and so on), the maximum number of characters thereof being, for example, up to 10 characters. Selection of a character string for any particular level is optional.

Figure 6:
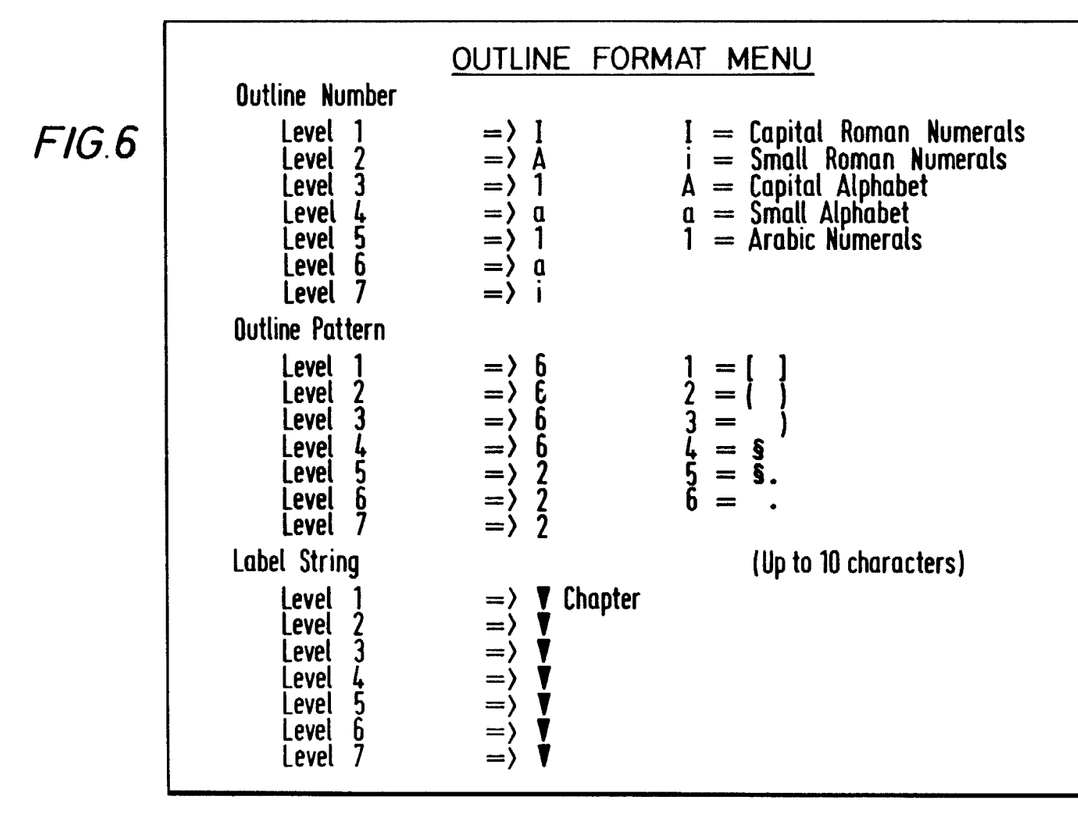
FIG. 6 corresponds to FIG. 5, but shows the menu after a selection has been made.

FIG. 6 shows how the display screen might appear after the kinds of outline numbers, the symbols (outline patterns) and names (label strings) attached to the outline numbers have been selected for each of levels 1 to 7 by operating keys of the keyboard 10. In the example illustrated in FIG. 6, capital Roman numerals, Capital alphabet, Arabic numerals, small alphabet, Arabic numerals, small alphabet and small Roman numerals have been selected for levels 1 to 7, respectively. The symbols (outline patterns) chosen to accompany the selected outline numbers are " ." for levels 1 to 4 and "( )" for levels 5 to 7. The name (label strings) "Chapter" is specified to be attached to the outline number for level 1, no name being specified (in this example) for the other levels.

These items comprising outlines and associated titles are inserted into input text (sentences) as will be described later. Also, they can be taken out thereafter and used to create the table of contents. Accordingly, in order to distinguish the items to be used for making up the table of contents from the other text portions, specifying marks in the form of inverse delta marks are attahced to the head and tail of each such item. In this example, upon specifying the names of the items when chosing label strings in the menu selection operation, the leading or opening specifying inverse delta mark is attached to the head of each item so that, in level 1, the specifying mark is attached to the front of "Chapter", while the leading or opening specifying mark only is selected in levels 2 to 7. The identifying mark to be attached to the tail of each item (i.e. the trailing or closing inverse delta mark) is set last after the contents of the item have been completed by typing in a title or other heading (block 309 of FIG. 3) after automatic generation and display (block 308 of FIG. 3) of the label string (if any), outline number and outline pattern.

Figure 7:
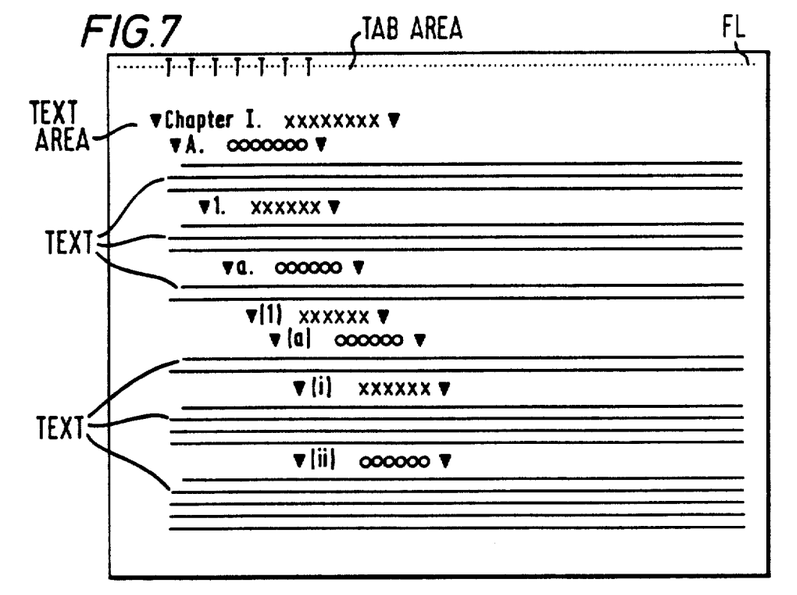
FIG. 7 shows the display screen displaying created text comprising text portions headed or separated by various outline items.

FIG. 7 shows an example of the display screen of the display 40 after text including outlines has been created. The numeral ("1", for example) at the upper right hand corner of the display screen represents the page number. On the display screen of FIG. 7, at level 1, there is displayed an item "Chapter I. XXXXXXXX" comprising the label string "Chapter", the kind of outline number ("I") selected for level 1, the outline pattern (" .") selected for level 1 and a character string or title (represented as "XXXXXXXX"), the whole item being sandwiched between inverse delta marks. Next, an item "A.OOOOOOO" containing the kind of outline number and pattern selected for level 2 and a title (represented as "OOOOOOO") is displayed and is sandwiched between inverse delta marks. After these items, text (sentences) shown by lines extending across the display screen in FIG. 7 are typed in (block 310 of FIG. 3). Thereafter, in like manner, other outline items (sandwiched between inverse delta marks) containing the outline number of the appropriate level as specified by the outline format menu in FIG. 6 are displayed at various appropriate levels in spaces between portions of text (sentences).

To specify each outline item to be inserted into the text as shown in FIG. 7, the user positions the cursor CS at a position along the row (horizontal) direction corresponding to (vertically aligned with) the appropriate tab position mark "T" on the frame line FL on the display screen (block 306 of FIG. 3) and then presses simultaneously the "CODE" key and the "O" alphabet key of the keyboard 10 (block 307 of FIG. 3), whereupon an outline number of the kind corresponding to the level of the position along the row direction is produced sequentially and then displayed (block 308 of FIG. 3) together with the associated label string (if any) and outline pattern.

This will be described more fully with reference to the block diagram of FIG. 2. Data indicative of the starting position of the item, the kind of outline number corresponding to the starting position of the item (as specified in FIG. 6), the symbol or symbols (outline pattern) to be attached to the outline number and the name (label string) of the item are supplied to the input terminal 107 of FIG. 2 and stored in the first storage means 108. When the cursor CS is set at a position corresponding to a desired tab mark "T" on the frame line FL of the display screen and the "CODE" key and "O" alphabet key of the keyboard 10 are pressed, the position in the row direction (and therefore the level) is detected by the tab position detecting means 109. An output signal from the tab position detecting means 109 causes the outline pattern that is to be added to the kind of outline number—and the name (if any)—corresponding to the specified position to be read out from the first storage means 108. At the same time, the counter 111 counts how many times the outline number for the same position or level is specified. In this embodiment, the counter 111 is realised by the CPU 20 (FIG. 1). To this end, the program for operating the CPU 20 includes a program having a flow chart as shown in FIG. 9.

Figure 9:
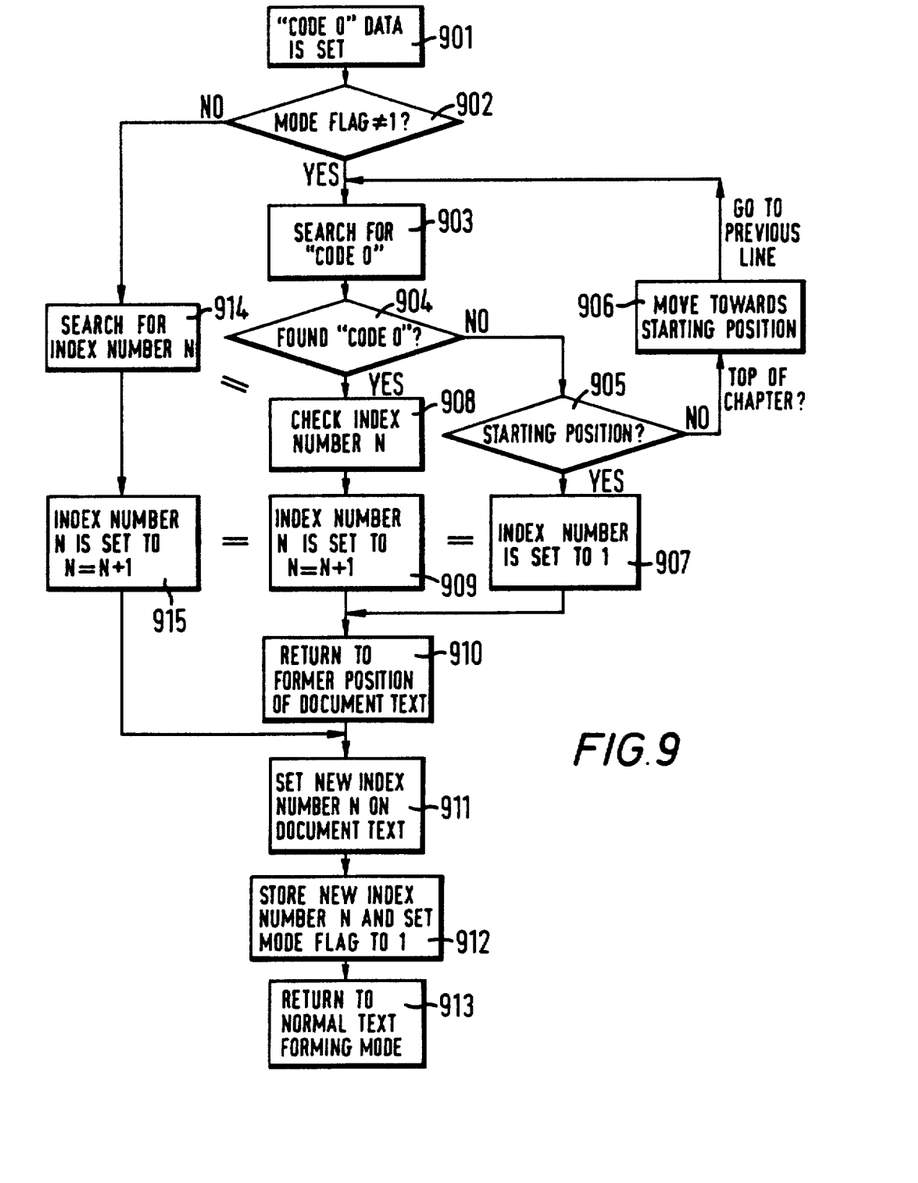
FIG. 9 is a flow chart showing the operation of a numbering mode carried out by the apparatus.

The flow chart of FIG. 9 shows the operation of the CPU 20 in the numbering mode. The CPU 20 is arranged to operate in accordance with the flow chart of FIG. 9 each time that the numbering mode is selected during a series of operations involved in creating a document. As indicated above, the numbering mode is selected by pressing simultaneously the "CODE" and "O" alphabet keys of the keyboard 10 to generate appropriate control data. This operation will be referred to subsequently as generating or setting "CODE O" data. "CODE O" data may also be set (i.e. the number mode may be selected) by pressing INDENT and SPACE keys of the keyboard 10.

When the "CODE O" data is set (block 901 of FIG. 9), the CPU 20 carries out an operation (block 902) to judge the status of a mode flag. If the mode flag=1, this indicates that "CODE O" has already been specified in a series of operations involved in creation of a document.

In the judging operation represented by the block 902, it is determined whether or not the condition mode flag≠1 is established. When the answer is YES, that is to say that "CODE O" data has been set for the first time in a series of operations to create a document, the document data stored in the text memory 22 or the document text is searched for the previous outline number (if any) by searching for "CODE O" data (block 903) and a decision is made (block 904) as to whether any such data has been found. This search operation is carried out such that any "CODE O" data is detected from among the text data by sequentially searching for outline numbers from the position at which the "CODE O" data has been specified back to the starting position of the document (blocks 905 and 906). If no "CODE O" data is detected by sequentially searching for the outline number back to the starting position of the document data, the outline number or index number N is set to "1" (block 907). If, on the other hand, the previously formed text data is read out from the floppy disk 30 to thereby make succeeding sentences and if an index number N is set on the previously formed text data by "CODE O" data, the "CODE O" data is detected, the index number N at that position is checked (block 908) and a new index number N is set by making N=N+1(block 909).

After a new index number N has been set as described above (block 907 or block 909) the "CODE O" data is returned to the former position of the document text (block 910) by operation of the keyboard 10 and the new index number N is set (block 911) at this former position. Further, the new index number N is stored in the working memory 21 and the mode flag is set to "1" (block 912) and then the present mode is returned to the normal text forming mode (block 913).

If the above-described judging operation performed by the block 902 gives the answer NO, that is to say if it is established that the mode flag=1, meaning that "CODE O" data already has been set, the index number N stored in the working memory 21 is searched for and read out therefrom (block 914) and a new index number N=N+1 (block 915) is set. Then, the new index number N=N+1 is set on the document text and once again stored in the working memory 21 (block 912), and the present mode is returned to the normal text forming mode (block 913).

Figure 10:
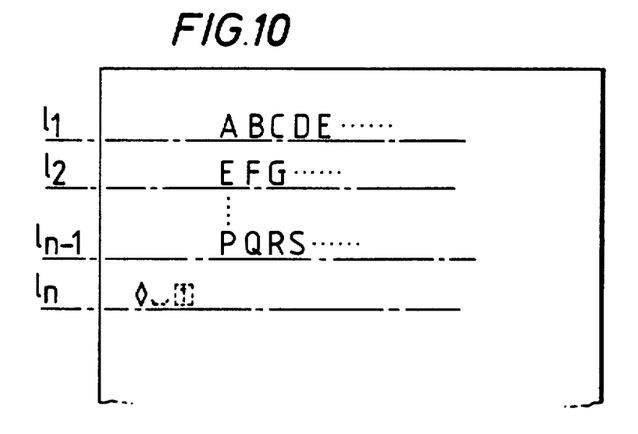
FIGS. 10 and 11 are respective schematic diagrams showing examples of displayed content of a document created in the numbering mode.

That is, according to the embodiment in which the numbering mode operation shown in the flow chart of FIG. 9 is carried out, in the course of, for example, a series of operations to create a document, if the INDENT key and the SPACE key of the keyboard 10 are operated at the position of the $1_n$-th line to thereby set "CODE O" data, a display indicative of the contents of the document text as, for example, shown in FIG. 10, is displayed on the display screen of the display 40.

In FIG. 10, the symbol $^\wedge$ is an indent mark which indicates that the INDENT key has been operated, and the symbol $\vdots\vdots$ represents an operation of the SPACE key, which becomes an empty space in practice. The indent mark $\lozenge$ is not printed out when the document data is printed out on paper by the printer 50. Further, when, by operation of the CPU 20 as described above, "CODE O" data is not detected by searching for outline numbers back to the first line $1_1$ on the document text, "1" is set on the position of the symbol $\vdots\ldots\vdots$ on the line $1_n$ on the above-described document text as the index number N.

Figure 11:
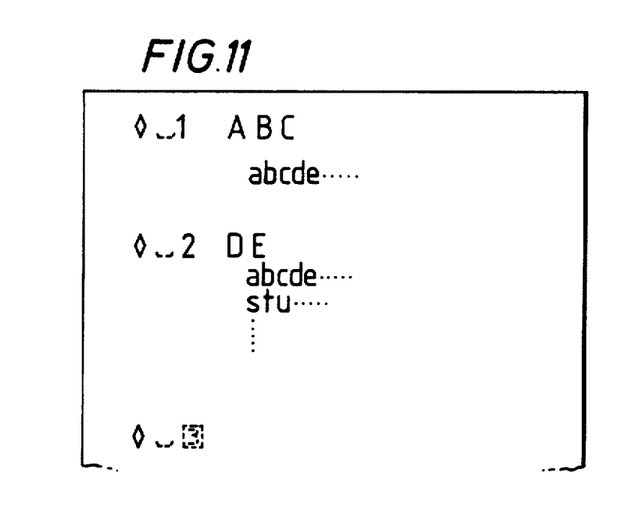

Furthermore, when, for example as shown in FIG. 11, a document with the index number 2 is read out from the floppy disk 30 to thereby create a succeeding document, if "CODE O" data is set at a position on the text to which the next index number N(N=3) should be attached, then by virtue of the operation of the CPU 20, an index number N=3 is set automatically.

As described above, according to the automatic numbering apparatus for a text processing system of this embodiment, when the document is formed to enable the combination of table of contents creation and outline creation so as sequentially to attach an index number for each item, by operating the keys of the keyboard 10 to set the above-described "CODE O" data it is possible automatically to set the index number on the document text.

As described above, the data indicative of the kind of outline number, the outline pattern and the label string is supplied to the number generator 110. The number generator 110 sequentially produces data such as an outline number or the like corresponding to the starting position of the instructed item. This data is supplied to the display controller 112 and also to the second storage means 113, in which it is stored. Thus, the data stored in the second storage means 113 includes data indicative of the outline number generated by the number generator 110 and the starting position thereof. Further, when the text is created by operation of the keyboard 10, the character pattern generator 114 produces corresponding character pattern data which is supplied to and stored in the second storage means 113. Then, the contents of the second storage means 113 are supplied to the display controller 112. Accordingly, when output data from an output terminal 115 of the display controller 112 is supplied through the CPU 20 to the display 40, the material shown in FIG. 7 is displayed on the display screen of the display 40. Further, when the contents of the second storage means 113 are supplied to the printer 50 from the output terminal 16 through the CPU 20, the content of the picture on the display screen of the display 40, as shown in FIG. 7, is printed out on paper.

Figure 8:
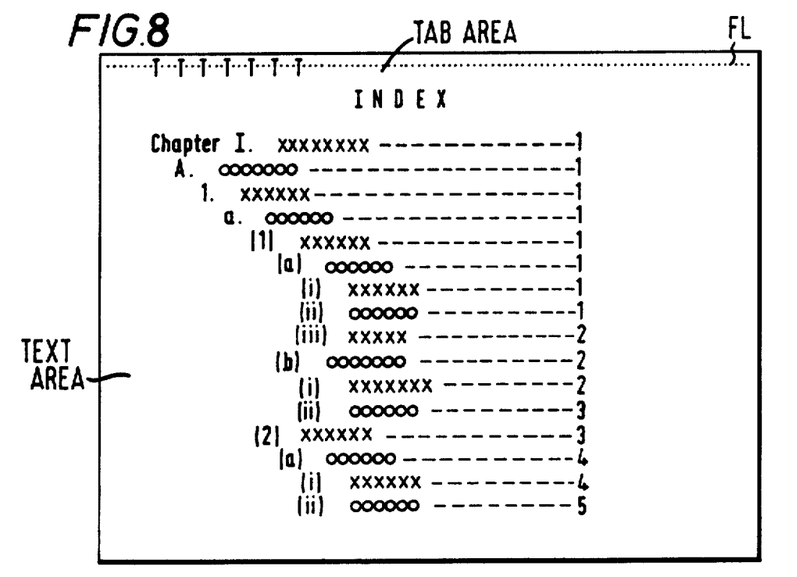
FIG. 8 shows the display screen displaying a table of contents or index compiled by listing the outline items.

Further, of the contents of the second storage means 113, the outline item, the corresponding position and the corresponding page are searched by the outline search device 17 to thereby create the data used to form a table of contents and the data concerning the table of contents is stored once in the second storage means 113, supplied to the display controller 112 and delivered from the output terminal 115 through the CPU 20 to the display 40, whereby a table of contents as shown in FIG. 8 is displayed on the display screen of the display 40 and this data is supplied from the output terminal 16 through the CPU 20 to the printer 50 so as thereby to be printed out on paper. In this case, the starting position in the row direction of each item of the table of contents is set at the same position as the data is inserted into the text.

According to the automatic numbering apparatus for a text processing system according to the above embodiment, it is possible to extract the items inserted into the text and automatically and easily to create a table of contents.

While, in the above-described embodiment, the present invention is applied to a word processor for the English language, embodiments of the invention can be applied to word processors for other European languages and the Japanese language. When the invention is applied to a word processor for the Japanese language, characters may be written in the vertical direction. In that case, the starting position of the item is put at a position in the column (vertical) direction.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A display editing apparatus for text processing pages of data and displaying outline data, comprising:
    input means for inputting outline position data, outline format data, and data page numbers;
    means for marking a head and tail of a portion of said outline data;
    display means for displaying outline data in accordance with corresponding outline position data and outline format data;
    storage means for storing said outline data, outline position data, and outline format data, said storage means having a first storage area for storing a starting position on said display of selected portions of said outline data and corresponding outline numbers;
    an outline number generator for generating sequential outline numbers corresponding to starting positions of said selected portions of said outline data;
    said storage means having a second storage area for storing an outline number generated by said outline number generator, a starting position thereof and a corresponding page number input by said input means;
    means for searching for a selected outline number, a corresponding position and a corresponding page number stored in said second storage area in said storage means;
    processing means connected to said storage means and receiving a command signal for determining outline data to be printed in accordance with corresponding outline position data; and
    printing means connected to said processing means and said storage means for printing said selected portions with said sequential numbers and for printing a table of contents having said selected portions of outline data and corresponding page numbers as searched by said means for searching.

2. A display editing apparatus for text processing and displaying a pluraltity of items of outline data which includes outline format data and outline position data, said apparatus comprising:
    display means for displaying the outline format data of the outline data;
    storage means for storing said outline format data and said outline position data, each of said outline format data corresponds to different outline position on a text line, said outline format data including at least a plurality of different outline numbers; and
    processing means connected to said storage means and receiving a command signal for determining the outline data to be displayed by said display means, said processing means comprising
    (a) means for generating a positioning signal which corresponds to a cursor position on a text line,
    (b) means for comparing said positioning signal with said outline position data and producing a resultant comparison output,
    (c) means responsive to said comparison output for selecting one of said items of outline format data to be read out from said storage means, and
    (d) means for supplying said selected outline format data from said storage means to said display means.

3. A display editing apparatus according to claim 2, wherein said display means comprises a display screen comprising a tab area and a text area.

4. A display editing apparatus according to claim 3, wherein said positioning signal is such as to indicate a horizontal position in said text area.

5. A display editing apparatus according to claim 3, wherein said positioning signal is such as to indicate a vertical position in said text area.

6. A display editing apparatus according to claim 3, wherein said outline numbers, can be selected from among a variety of types.

7. A display editing apparatus according to claim 6, wherein said outline format data further comprises an outline pattern to be combined with one of said outline numbers.

8. A display editing apparatus according to claim 6, wherein said outline format data comprises a label string to be combined with one of said outline numbers.

9. A display editing apparatus according to claim 2, wherein said processing means comprises means for positioning said cursor on a line which is the same as a line at which said outline format data is displayed.

10. A display editing apparatus according to claim 9, wherein said means for positioning includes means for setting said cursor to be aligned vertically with a predetermined tab position.

11. A display editing apparatus according to claim 9, comprising a tab setting means for aligning a starting position of said cursor, said setting means to set the cursor at said starting position.

12. A display editing apparatus according to claim 2, further including means for marking a head and a tail of a portion of said outline data, and in which said processing means further comprises means for searching for all marked portions of outline data and assembling all marked portions of said outline data together for display by said display means.

13. A display editing apparatus according to claim 12, wherein said assembled marked portions of outline data are stored in a selected area of said storage means.

14. A display editing apparatus according to claim 12, including means for attaching a sequential index number to all said marked portions of outline data, thereby automatically numbering outline data displayed on said display means.

* * * * *